US012603945B2

(12) United States Patent (10) Patent No.: US 12,603,945 B2

Xue et al. (45) Date of Patent: Apr. 14, 2026

(54) SYSTEMS AND METHODS FOR INFERRING USER ACTIVITIES FROM IoT NETWORK TRAFFIC

(71) Applicants: Guoliang Xue, Chandler, AZ (US); Yinxin Wan, Tempe, AZ (US); Kuai Xu, Peoria, AZ (US); Feng Wang, Peoria, AZ (US)

(72) Inventors: Guoliang Xue, Chandler, AZ (US); Yinxin Wan, Tempe, AZ (US); Kuai Xu, Peoria, AZ (US); Feng Wang, Peoria, AZ (US)

(73) Assignee: Arizona Board of Regents on Behalf of Arizona State University, Tempe, AZ (US)

( * ) Notice: Subject to any disclaimer, the term of this patent is extended or adjusted under 35 U.S.C. 154(b) by 198 days.

(21) Appl. No.: 18/620,681

(22) Filed: Mar. 28, 2024

(65) Prior Publication Data

US 2024/0333810 A1 Oct. 3, 2024

Related U.S. Application Data

(60) Provisional application No. 63/455,868, filed on Mar. 30, 2023.

(51) Int. Cl.
 *H04L 67/50* (2022.01)
 *H04L 67/12* (2022.01)
(52) U.S. Cl.
 CPC ............. *H04L 67/535* (2022.05); *H04L 67/12* (2013.01)

(58) Field of Classification Search
 CPC ............................. H04L 67/535; H04L 67/12
 USPC .......................................................... 709/217
 See application file for complete search history.

(56) References Cited

U.S. PATENT DOCUMENTS

2023/0238080 A1* 7/2023 Yekhanin ............... G16B 30/10
 702/20

OTHER PUBLICATIONS

Trimananda et al., "PingPong: Packet-Level Signatures for Smart Home Device Events", University of California, 2020, p. 1-24 (Year: 2020).*
Linardi, "Effective and Efficient Variable Length Data Series Analytics", 2020, Univ. of Paris, p. 1-4 (Year: 2020).*
R. Kaur and M. Singh, "A Survey on Zero-Day Polymorphic Worm Detection Techniques," in IEEE Communications Surveys & Tutorials, vol. 16, No. 3, pp. 1520-1549, Third Quarter 2014 (Year: 2014).*
Y. Wan, K. Xu, F. Wang and G. Xue, "IoTAthena: Unveiling IoT Device Activities From Network Traffic," in IEEE Transactions on Wireless Communications, vol. 21, No. 1, pp. 651-664, Jan. 2022 (Year: 2022).*
P. Rashidi, D. J. Cook, L. B. Holder and M. Schmitter-Edgecombe, "Discovering Activities to Recognize and Track in a Smart Environment," in IEEE Transactions on Knowledge and Data Engineering, vol. 23, No. 4, pp. 527-539, Apr. 2011 (Year: 2011).*

(Continued)

*Primary Examiner* — Taylor A Elfervig

(74) *Attorney, Agent, or Firm* — Polsinelli PC

(57) ABSTRACT

A system includes a processor that accesses a sequence of device events S from IoT network traffic and a plurality of user activity signatures, each user activity signature U in the plurality of user activity signatures being a known sequence of device events. The processor is configured to infer a user activity by way of approximate user activity signature matching.

14 Claims, 7 Drawing Sheets

100

(56)         References Cited

OTHER PUBLICATIONS

T. Gu, Z. Fang, A. Abhishek and P. Mohapatra, "IoTSpy: Uncovering Human Privacy Leakage in IoT Networks via Mining Wireless Context," 2020 IEEE 31st Annual International Symposium on Personal, Indoor and Mobile Radio Communications, London, UK, 2020, pp. 1-7 (Year: 2020).*
Yang et al., "Inference Attack in Android Activity based on Program Fingerprint", vol. 127, Feb. 1, 2019, pp. 92-106, Elsevier, Journal of Network and Computer Applications (Year: 2019).*
C. Duan, S. Zhang, J. Yang, Z. Wang, Y. Yang and J. Li, "PINBALL: Universal and Robust Signature Extraction for Smart Home Devices,"2021 IFIP/IEEE International Symposium on Integrated Network Management (IM), Bordeaux, France, 2021, pp. 1-9. (Year: 2021).*
T. Gu, Z. Fang, A. Abhishek, H. Fu, P. Hu and P. Mohapatra, "IoTGaze: IoT Security Enforcement via Wireless Context Analysis," IEEE INFOCOM 2020—IEEE Conference on Computer Communications, Toronto, ON, Canada, 2020, pp. 884-893 (Year: 2020).*
M. Miettinen et al., "IoT Sentinel Demo: Automated Device-Type Identification for Security Enforcement in IoT," 2017 IEEE 37th International Conference on Distributed Computing Systems (ICDCS), Atlanta, GA, USA, 2017, pp. 2511-2514 (Year: 2017).*
Y. Wan, K. Xu, G. Xue and F. Wang, "IoTArgos: A Multi-Layer Security Monitoring System for Internet-of-Things in Smart Homes," IEEE Infocom 2020—IEEE Conference on Computer Communications, Toronto, ON, Canada, 2020, pp. 874-883 (Year: 2020).*
Acar et al, Peek-a-boo: i see your smart home activities, even encrypted! Peek-a-boo: i see your smart home activities, even encrypted! In Proceedings of the 13th ACM Conference on Security and Privacy in Wireless and Mobile Networks (WiSec '20). Association for Computing Machinery, p. 207-218 (Year: 2020).*
Wan, "IoTMosaic: Inferring User Activities from IoT Network Traffic in Smart Homes" (Paper), 2022, pp. 1-10.
A. Acar, H. Fereidooni, T. Abera, A. K. Sikder, M. Miettinen, Aksu' M. Conti, A.-R. Sadeghi, and S. Uluagac, "Peek-a- Boo: I See Your Smart Home Activities, Even Encrypted!" in Proc. of ACM WiSec, Jul. 2020, 12 pages.
O. Alrawi, C. Lever, M. Antonakakis, and F. Monrose, "SoK: Security Evaluation of Home-Based IoT Deployments," in Proc. of IEEE S&P, 2019, 19 pages.
M. Antonakakis, T. April, M. Bailey, M. Bernhard, E. Bursztein, J. Cochran, Z. Durumeric, J. Halderman, L. Invernizzi, M. Kallitsis, D. Kumar, C. Lever, Z. Ma, J. Mason, D. Men-scher, C. Seaman, N. Sullivan, K. Thomas, and Y. Zhou, "Understanding the Mirai Botnet," in Proc. of USENIX Security, 2017, 19 pages.
C. Barry, "Ring Video Doorbells Rescued By This Great New Feature," Nov. 2020, https://www.forbes.com/sites/barrycollins/2020/11/29/ring-video-doorbells-rescued-by-this-great-new-feature/. 4 pages.
B. Bezawada, M. Bachani, J. Peterson, H. Shirazi, I. Ray, and I. Ray, "Behavioral Fingerprinting of IoT Devices," in Proc. of ACM ASHES, Oct. 2018, 10 pages.
V. Bhosale, L.-D. Carli, and I. Ray, "Detection of Anomalous User Activity for Home IoT Devices," in Proc. of IoTBDS, 2021, 6 pages.
S. Birnbach, S. Eberz, and I. Martinovic, "Peeves: Physical Event Verification in Smart Homes," in Proc. of ACM CCS, 2019, 11 pages.
H. Chi, Q. Zeng, X. Du, and L. Luo, "PFirewall: Semantics—Aware Customizable Data Flow Control for Home Automation Systems," in Proc. of NDSS, 2021, 16 pages.
S. Demetriou, N. Zhang, Y. Lee, X. Wang, C. Gunter, X. Zhou, and M. Grace, "HanGuard: SDN-driven Protection of Smart Home WiFi Devices from Malicious Mobile Apps," in Proc. of ACM WiSec, 2017, 12 pages.
J. Fan, Y. He, B. Tang, Q. Li, and R. Sandhu, "Ruledger: Ensuring Execution Integrity in Trigger-Action IoT Platforms," in Proc. of IEEE Infocom, 2021, 10 pages.

E. Fernandes, J. Jung, and A. Prakash, "Security Analysis of Emerging Smart Home Applications," in Proc. of IEEE S&P, 2016, 19 pages.
C. Fu, Q. Zeng, and X. Du, "HAWatcher: Semantics—Aware Anomaly Detection for Appified Smart Homes," in Proc. of USENIX Security, 2021, 19 pages.
S. Herwig, K. Harvey, G. Hughey, R. Roberts, and D. Levin, "Measurement and Analysis of Hajime' a Peer-to-peer IoT Botnet," in Proc. of NDSS, 2019, 15 pages.
Y. Jia, Y. Xiao, J. Yu, X. Cheng, Z. Liang, and Z. Wan, "A Novel Graph-based Mechanism for Identifying Traffic Vulnerabilities in Smart Home IoT," in Proc. of IEEE Infocom, 2018, 9 pages.
Y. Jia, L. Xing, Y. Mao, D. Zhao, X. Wang, S. Zhao, and Y. Zhang, "Burglars' IoT Paradise: Understanding and Mitigating Security Risks of General Messaging Protocols on IoT Clouds," in Proc. of IEEE S&P, 2020, 17 pages.
J. Kleinberg and E. Tardos, Algorithm Design. Pearson/Addison-Wesley, 2006, 432 pages (Part 1-4).
D. Kumar, K. Shen, B. Case, D. Garg, G. Alperovich, D. Kuznetsov, R. Gupta, and Z. Durumeric, "All Things Considered: An Analysis of IoT Devices on Home Networks," in Proc. of USENIX Security, 2019, 18 pages.
T. Li, D. Han, J. Li, A. Li, Y. Zhang, R. Zhang, and Y. Zhang, "Your Home is Insecure: Practical Attacks on Wireless Home Alarm Systems," in Proc. of IEEE Infocom, 2021, 10 pages.
X. Ma, J. Qu, J. Li, J. C. Lui, Z. Li, and X. Guan, "Pinpointing Hidden IoT Devices via Spatial-temporal Traffic Fingerprinting," in Proc. of IEEE INFOCOM, 2020, 10 pages.
S. Manandhar, K. Moran, K. Kafle, R. Tang, D. Poshyvanyk, and A. Nadkarni, "Towards a Natural Perspective of Smart Homes for Practical Security and Safety Analyses," in Proc. of IEEE S&P, 2020, 18 pages.
M. Miettinen, S. Marchal, I. Hafeez, N. Asokan, A.-R. Sadeghi, and S. Tarkoma, "IoT SENTINEL: Automated Device-Type Identification for Security Enforcement in IoT," in Proc. of IEEE ICDCS, 2017, 8 pages.
P. Morgner, S. Mattejat, Z. Benenson, C. Muqller, and F. Armknecht, "Insecure to the Touch: Attacking ZigBee 3.0 via Touchlink Commissioning," in Proc. of ACM WiSec, 2017, 11 pages.
A. Mosenia and N.-K. Jha, "A Comprehensive Study of Security of internet-of-Things," IEEE Transactions on Emerging Topics in Computing, vol. 5, No. 4, Sep. 2016, pp. 586-602.
T. OConnor, R. Mohamed, M. Miettinen, W. Enck, B. Reaves, and A.-R. Sadeghi, "HomeSnitch: Behavior Transparency and Control for Smart Home IoT Devicess," in Proc. of ACM WiSec, 2019, 12 pages.
P. Rashidi, D. J. Cook, L. B. Holder, and M. Schmitter-Edgecombe, "Discovering Activities to Recognize and Rrack in a Smart Environment," IEEE Transactions on Knowledge and Data Engineering, vol. 23, No. 4, 2011, pp. 527-539.
J. Ren, D. J. Dubois, D. Choffnes, A. M. Mandalari, R. Kolcun, and H. Haddadi, "Information Exposure From Consumer IoT Devices: A Multidimensional, Network-Informed Measurement Approach," in Proc. of ACM IMC, 2019, 13 pages.
E. Ronen, C. O'Flynn, A. Shamir, and A.-O. Weingarten, "IoT Goes Nuclear: Creating a ZigBee Chain Reaction," in Proc. of IEEE S&P 2017, 18 pages.
M. R. Shahid, G. Blanc, Z. Zhang, and H. Debar, "IoT Devices Recognition Through Network Traffic Analysis," in Proc. of IEEE International Conference on Big Data, 2018, 6 pages.
A. Sivanathan, H. H. Gharakheili, F. Loi, A. Radford, C. Wijenayake, A. Vishwanath, and V. Sivaraman, "Classifying IoT Devices in Smart Environments Using Network Traffic Characteristics," IEEE Transactions on Mobile Computing, vol. 18, No. 8, Aug. 2019, 15 pages.
V. Sivaraman, D. Chan, D. Earl, and R. Boreli, "Smart-Phones Attacking Smart-Homes," in Proc. of ACM WiSec, 2016, 6 pages.
R. Trimananda, J. Varmarken, A. Markopoulou, and B. Demsky, "PingPong: Packet-Level Signatures for Smart Home Device Events," in Proc. of NDSS, 2019, 24 pages.

(56) References Cited

OTHER PUBLICATIONS

Y. Wan, K. Xu, F. Wang, and G. Xue, "Characterizing and Mining Traffic Patterns of IoT Devices in Edge Networks" IEEE Transactions on Network Science and Engineering vol. 8, No. 1, pp. 89-101, 2020.

Y. Wan, K. Xu, F. Wang, and G. Xue, "IoTAthena: Unveiling IoT Device Activities from Network Traffic," IEEE Transactions on Wireless Communications, vol. 21, No. 1, Jan. 2022, 14 pages.

Y. Wan, K. Xu, G. Xue, and F. Wang, "IoTArgos: A Multi-Layer Security Monitoring System for Internet-of-Things in Smart Homes," in Proc. of IEEE Infocom, 2020, 10 pages.

Q. Wang, W. Hassan, A. Bates, and C. Gunter, "Fear and Logging in the Internet of Things," in Proc. of NDSS, 2018, 16 pages.

K. Xu, Y. Wan, G. Xue, and F. Wang, "Multidimensional Behavioral Profiling of Internet-of-Things in Edge Networks," in Proc. of IEEE/ACM IWQOS, 2019, 10 pages.

L. Yu, B. Luo, J. Ma, Z. Zhou, and Q. Liu, "You Are What You Broadcast: Identification of Mobile and IoT Devices from (Public) WiFi," in Proc. of USENIX Security, 2020, 19 pages.

W. Zhang, Y. Meng, Y. Liu, X. Zhang, Y. Zhang, and H. Zhu, "HoMonit: Monitoring Smart Home Apps from Encrypted Traffic," in Proc. of ACM CCS, 2018, 15 pages.

W. Zhou, Y. Jia, Y. Yao, L. Zhu, L. Guan, Y. Mao, P. Liu, and Y. Zhang, "Discovering and Understanding the Security Hazards in the Interactions between IoT Devices' Mobile Apps, and Clouds on Smart Home Platforms," in Proc. of USENIX Security, 2019, 19 pages.

T. Zillner, "ZigBee Exploited: The Good 'the Bad and the Ugly'" in Proc. of the DeepSec Conferences in Depth Security, 2017, 16 pages.

* cited by examiner

100

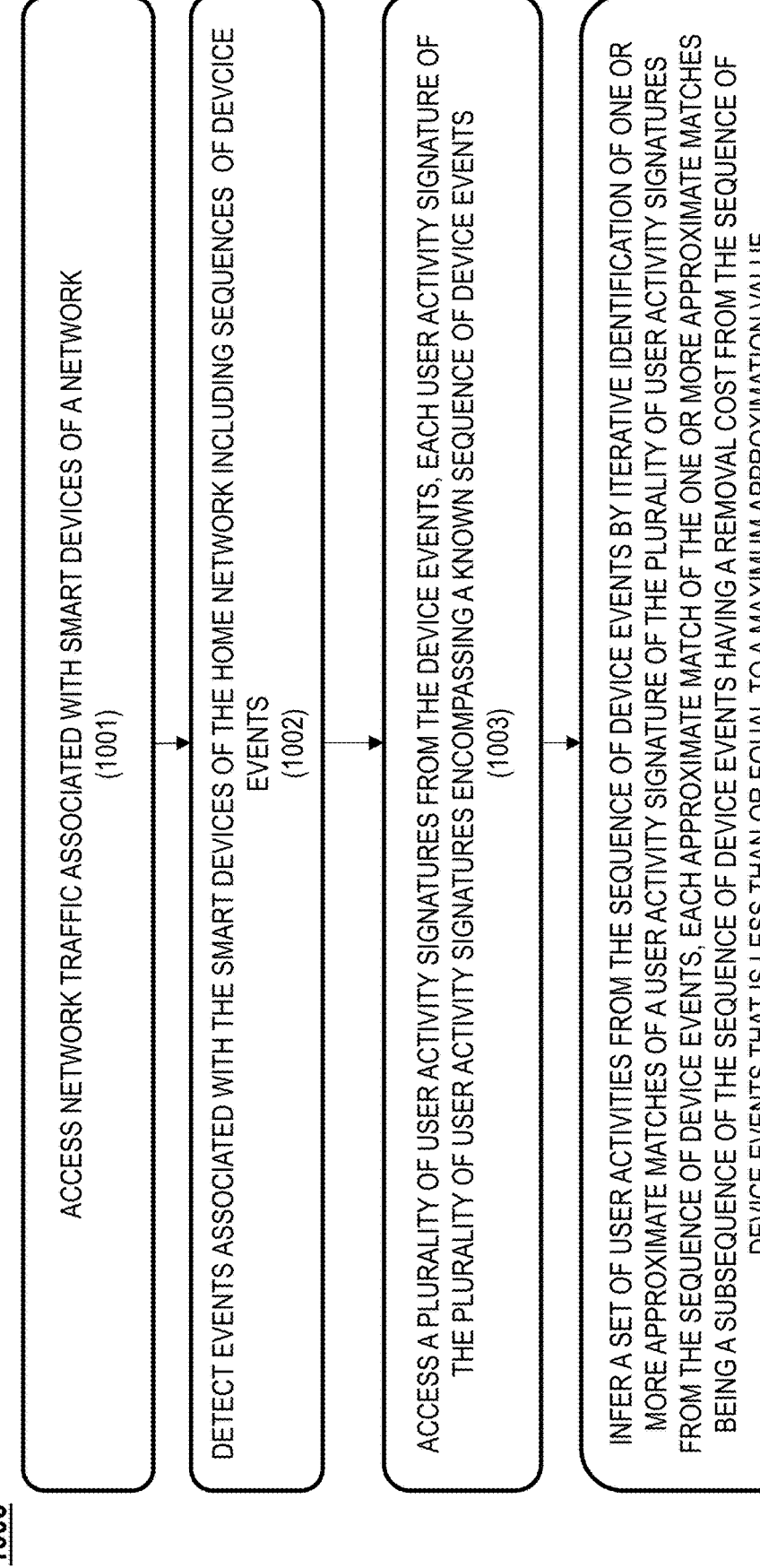

ACCESS NETWORK TRAFFIC ASSOCIATED WITH SMART DEVICES OF A NETWORK
(1001)

DETECT EVENTS ASSOCIATED WITH THE SMART DEVICES OF THE HOME NETWORK INCLUDING SEQUENCES OF DEVICE EVENTS
(1002)

ACCESS A PLURALITY OF USER ACTIVITY SIGNATURES FROM THE DEVICE EVENTS, EACH USER ACTIVITY SIGNATURE OF THE PLURALITY OF USER ACTIVITY SIGNATURES ENCOMPASSING A KNOWN SEQUENCE OF DEVICE EVENTS
(1003)

INFER A SET OF USER ACTIVITIES FROM THE SEQUENCE OF DEVICE EVENTS BY ITERATIVE IDENTIFICATION OF ONE OR MORE APPROXIMATE MATCHES OF A USER ACTIVITY SIGNATURE OF THE PLURALITY OF USER ACTIVITY SIGNATURES FROM THE SEQUENCE OF DEVICE EVENTS, EACH APPROXIMATE MATCH OF THE ONE OR MORE APPROXIMATE MATCHES BEING A SUBSEQUENCE OF THE SEQUENCE OF DEVICE EVENTS HAVING A REMOVAL COST FROM THE SEQUENCE OF DEVICE EVENTS THAT IS LESS THAN OR EQUAL TO A MAXIMUM APPROXIMATION VALUE
(1004)

SYSTEMS AND METHODS FOR INFERRING USER ACTIVITIES FROM IoT NETWORK TRAFFIC

CROSS REFERENCE TO RELATED APPLICATIONS

This is a non-provisional application that claims benefit to U.S. Provisional Application Ser. No. 63/455,868, filed on Mar. 30, 2023, which is herein incorporated by reference in its entirety.

GOVERNMENT SUPPORT

This invention was made with government support under 1717197, 1816995, and 2007469 awarded by the National Science Foundation. The government has certain rights in the invention.

FIELD

The present disclosure generally relates cyber-physical systems, artificial intelligence (AI), cloud computing, and Internet-of-Things (IOT) concepts; and in particular to systems and computational methods for inferring user activities from IoT network traffic, among other aspects described herein.

BACKGROUND

Recent advances in cyber-physical systems, artificial intelligence, and cloud computing have driven the wide deployment of Internet-of-things (IoT) in smart homes. With the prevalence and popularity of IoT devices, a wide range of innovative services and applications such as home automation, remote healthcare, and voice assistants are available for homeowners. These dedicated IoT devices mostly work independently for specific functions, e.g., a smart camera starts recording once sensing sound or motions, and a smart lock is opened or closed remotely via a companion smartphone app.

It is with these observations in mind, among others, that various aspects of the present disclosure were conceived and developed.

BRIEF DESCRIPTION OF THE DRAWINGS

FIG. 6 is a flow chart of an example process associated with the system described herein.

Corresponding reference characters indicate corresponding elements among the view of the drawings. The headings used in the figures do not limit the scope of the claims.

DETAILED DESCRIPTION

Figure 1:
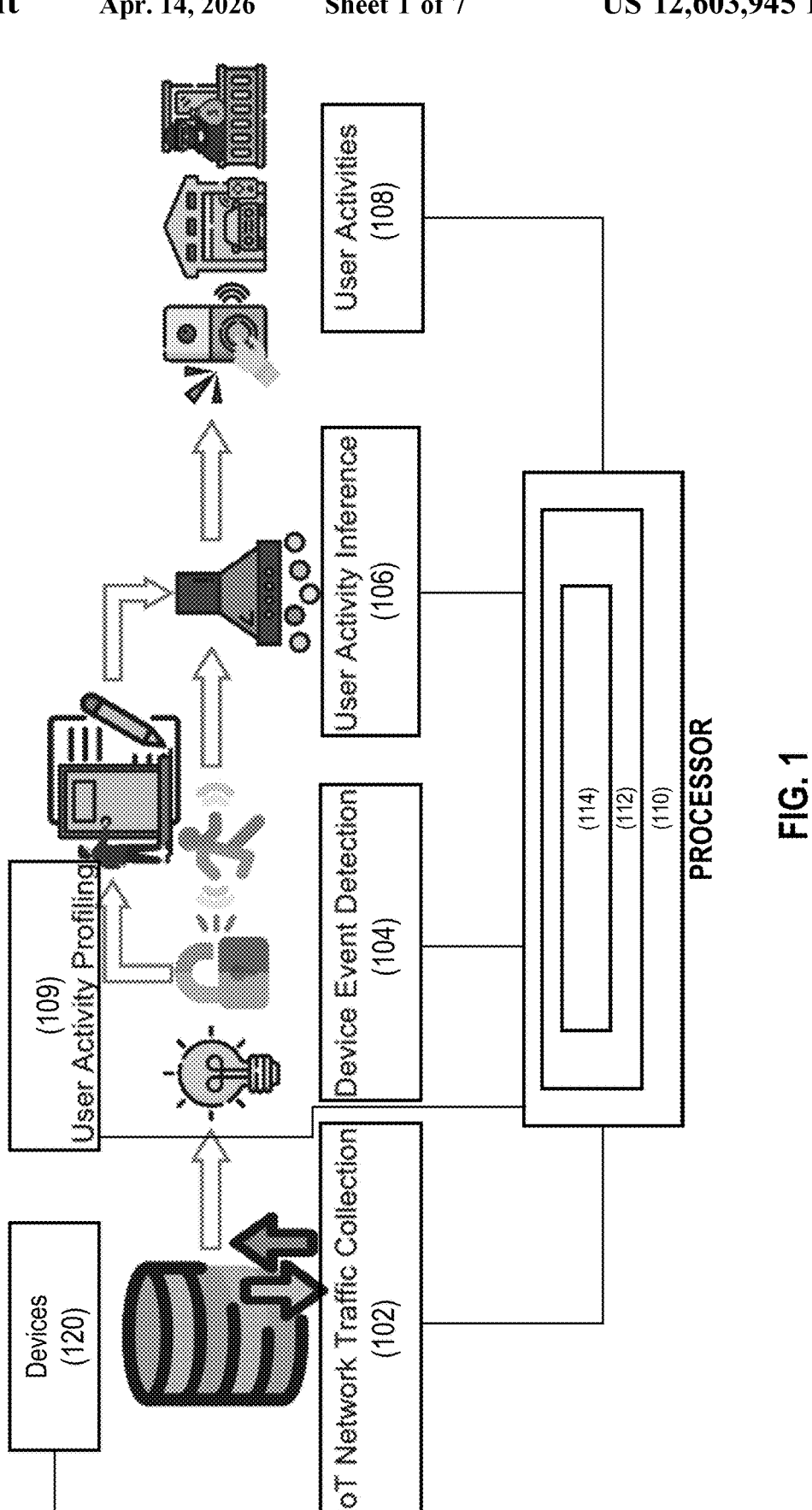
FIG. 1 is an illustration of an example system architecture for inferring user activity from IoT network traffic in smart homes.

The present disclosure relates to an inventive concept including a computer-implemented systems and methods for inferring user activity from IoT network traffic (in, e.g., smart home environments with one or more smart devices). The present disclosure describes a study regarding how we could explore the collective insights from multiple heterogeneous IoT devices to infer user activities for home safety monitoring and assisted living. Specifically, the computer-implemented system, dubbed "IoTMosaic", is described and believed to be the first profile diverse user activities with distinct IoT device event sequences, which are extracted from smart home network traffic based on their TCP/IP data packet signatures. Given the challenges of missing and out-of-order IoT device events due to device malfunctions or varying network and system latencies, IoTMosaic further develops simple yet effective approximate matching algorithms to identify user activities from real-world IoT network traffic. Experimental results on thousands of user activities in the smart home environment over two months show that the proposed algorithms described herein can infer different user activities from IoT network traffic in smart homes with the overall accuracy, precision, and recall of 0.99, 0.99, and 1.00, respectively.

In some examples, the system described herein includes a processor in communication with a memory. The memory includes instructions executable by the processor to: access a sequence of device events S, access a plurality of user activity signatures, each user activity signature U in the plurality of user activity signatures comprising a known sequence of device events, and infer user activity from the sequence of device events S using approximate signature matching, as described herein. Other examples of the system are contemplated.

Introduction

Recent advances in cyber-physical systems, artificial intelligence, and cloud computing have driven the rapid growth and deployment of IoT devices in smart homes. Although there is a rich literature in studying traffic patterns, security and privacy challenges, and device events and functions of individual IoT devices, little effort has been devoted to exploring IoT network traffic for inferring user activities. Yet, the accurate knowledge and awareness of user activities in smart homes is crucial for home safety monitoring and assisted living, e.g., a motion sensor's motion detection event at the front door followed by a smart lock's open event indicating a person entering the home.

Towards filling this technical need/problem, the present disclosure introduces the new (computer-implemented) system, namely IoTMosaic, for inferring user activities from IoT network traffic in the smart home environment. IoTMosaic first recognizes and generates the signatures of user activities by characterizing each user activity with an ordered sequence of IoT device events via controlled experiments in smart homes. Based on the signatures of user activities, we could search and match them from IoT device event streams extracted from IoT network traffic for user activity inference. However, the sequence of IoT devices events for a given user activity sometimes is disrupted by missing or out-of-order device events due to device malfunctions, long end-to-end network latencies between IoT devices and cloud servers, and extended wake-up delays from the sleep mode of battery-powered devices.

Given the existence of missing or out-of-order device events, the present disclosure formulates a new research problem of inferring user activities with approximate user activity signature matching. And, to address this problem, simple yet effective approximate matching algorithms are developed which can identify the exact or approximate matches with a varying number of missing device events. In addition, a heuristic trimming strategy is devised to resolve the conflicts caused by multiple matches of different user activities which share overlapping device events in their signatures.

To systematically evaluate the performance of the proposed IoTMosaic system, a real-world smart home environment is set up consisting of heterogeneous IoT devices with various functions in a two-bedroom apartment, 21 user activities are identified that are common and crucial to home safety and security. The extensive experiments conducted on the dataset which includes thousands of user activities collected during a two-month long period have shown that IoTMosaic is able to infer all of these 21 user activities from the IoT network traffic with high accuracy, precision, and recall.

A summary of at least some features of the inventive concept set forth in the present disclosure are as follows:

We design and implement IoTMosaic to first profile diverse user activities in smart homes and identify the unique IoT device event sequences as their signatures. Subsequently, we develop deterministic approximate signature matching algorithms for inferring user activities from the device event sequences.

We propose the approximate signature matching algorithms with rigorous theoretical analysis to effectively infer user activities with the flexibility of allowing missing or out-of-order IoT device events due to device malfunctions or varying network and system latencies.

Our two-month long experiments based on a real-world smart home have demonstrated that our proposed algorithms can infer different user activities from IoT network traffic with the overall accuracy, precision, and recall of 0.99, 0.99, and 1.00, respectively.

System Overview & Architecture

Towards a User Activity Inference System:

As previously described, with the prevalence and popularity of IoT devices, a wide range of innovative services and applications such as home automation, remote healthcare, and voice assistants are available for homeowners. These dedicated IoT devices mostly work independently for specific functions, e.g., a smart camera starts recording once sensing sound or motions, and a smart lock is opened or closed remotely via a companion smartphone app.

Many real-world user activities trigger a sequence of temporally and spatially correlated events involving multiple IoT devices. The individual device event information of each of these IoT devices often lacks sufficient evidence to infer the user activities and tell homeowners what happened in their homes. For example, a delivery personnel dropping off a package on the front door and ringing the Ring Doorbell could trigger the motion detection event and the doorbell's ringing event. However, exploring correlated events and collective insights from heterogeneous IoT devices in the same home could reveal many important user activities. Such automated user activity monitoring and inference system could have many practical benefits in home safety and security, assisted living, and remote healthcare.

Towards this end, the inventive concept described herein includes the IoTMosaic system for automatically and algorithmically inferring user activities based on the underlying network traffic of IoT devices in smart homes. Rather than inferring user activities directly from the IoT network traffic, IoTMosaic first detects IoT device events by analyzing network traffic in smart homes. Based on these extracted IoT device events, IoTMosaic generates the signatures of diverse user activities which consist of IoT device event sequences. IoTMosaic then infers user activities using approximate matching algorithms to accommodate missing or out-of-order IoT device events due to device malfunctions or varying latencies.

Figure 7:
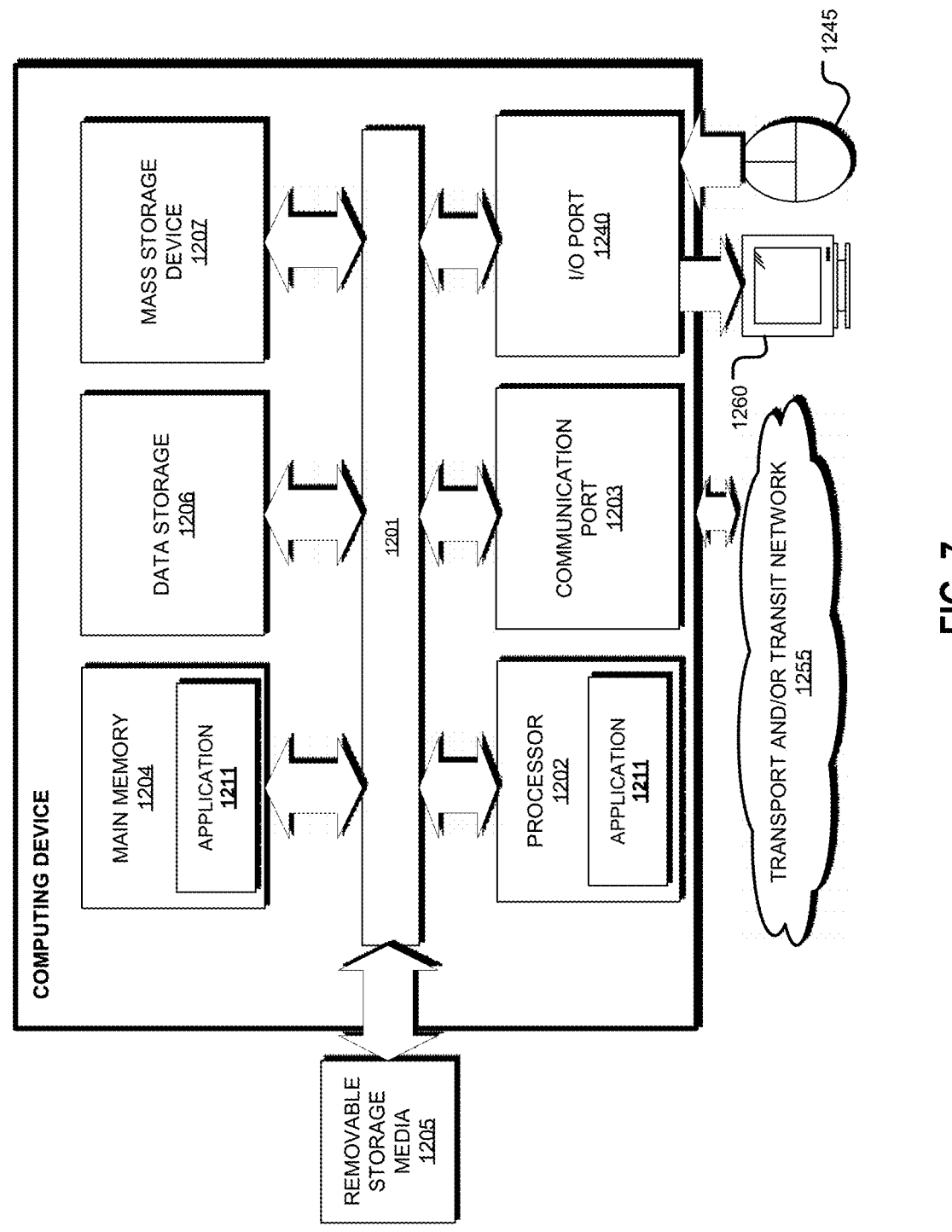
FIG. 7 is a simplified block diagram of an exemplary computing device that may be configured to implement various functions and processes described herein.

Example system architecture & components:

FIG. 1 illustrates the IoTMosaic's overall system architecture for inferring user activity from IoT network traffic in smart homes. The IoTMosaic system example (100) consists of four main components: i) IoT network traffic collection 102, ii) IoT device event detection 104, iii) user activity profiling 106, and vi) user activity inference 108, described herein. Aspects of the functionality provided by the system 100 described herein (e.g., components 102, 104, 106, 108, and 109 of FIG. 1) may be implemented as code and/or machine-executable instructions (114) executable by a processor 110 that may represent one or more of a procedure, a function, a subprogram, a program, a routine, a subroutine, a module, an object, a software package, a class, or any combination of instructions, data structures, or program statements, and the like. In other words, one or more of the features for inferring user activities and processing described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium (e.g., memory 112 and/or the memory of a computing device 1200 of FIG. 7), and the processor 110 performs the tasks defined by the code. In some embodiments, the processor is a processing element of a cloud such that the instructions are implemented via a cloud-based web application. Regardless, the instructions 114 stored in memory 112 configure the processor 110 to perform various functions described herein associated with the system 100 (e.g., access network traffic, detect device events, infer user activities, and predict user activities as illustrated in FIG. 1).

A first system component, IoT network traffic collection 102, leverages any number of type of devices 120 associated with a smart home network to collect IOT network traffic. In some examples, the devices include programmable home routers to continuously collect, process, and analyze outgoing and incoming time-stamped TCP/IP data packets of smart home IoT devices. Alternatively or in combination, devices 120 can include any smart home IoT devices providing network traffic and/or associated metadata. For the second component, IoT device event detection 104, the present inventive concept adopts on or more solutions for extracting IoT device events from network traffic collected by the home routers in the first component.

The focus of the present inventive concept is to describe example implementations of the last two system components in FIG. 1, i.e., user activity profiling 106 and user activity (108) inference. For learning and profiling user activities, we first collect IoT network traffic in smart homes while repeatedly running and labeling each user activity as ground truth. Subsequently, we extract the sequence of IoT device events as the signature for each user activity. The user activity profiling (109) component is responsible for recognizing and generating the signatures of different user activities which are the input of the next user activity inference component.

Towards developing the user activity inference system component, we propose simple yet effective algorithms for identifying user activities from IoT device events with the tolerance of missing events. Our proposed approximate matching algorithms effectively infer user activities with varying missing device events. In case of multiple matches to different user activities which share overlapping IoT device events, we devise a heuristic trimming step to strategically remove some inferred activities based on the number of missing device events and the dependency among the signatures of user activities.

To evaluate the performance of our proposed system, we set up an experimental smart home environment in a two-bedroom apartment with heterogeneous IoT devices. We systematically evaluate our system with different user activities, mostly related to home safety and security, in the smart home testbed. Our extensive experiments on the labeled user activities and network traffic data collected span over two months show that IoTMosaic is able to accurately infer diverse user activities in smart homes.

User Activities Profiling

Detecting IoT device events with IoT network traffic:

The network traffic of IoT devices plays a crucial role in classifying the IoT device types, e.g., LG smart TV, and detecting IoT device events, e.g., switching Philips Hue smart lighting on or off. These individual and distinguished events generated by IoT devices are referred to as IoT device events. Several recent parallel studies have proposed practical solutions to generate the traffic signatures of IoT device events and extract IoT device events via matching such signatures from the IoT network traffic.

In the present disclosure, we adopt the approach from Wan et al. (Y. Wan, K. Xu, F. Wang, and G. Xue, "IoTA-thena: Unveiling IoT Device Activities from Network Traffic," IEEE Transactions on Wireless Communications, vol. 21, no. 1, pp. 651-664, 2022), incorporated by reference in its entirety, to first generate the unique signature of each IoT device event with diverse traffic features including the crucial inter-packet time interval information in IP packets. Then we use the deterministic algorithms from Wan et al. to extract IoT device events in our smart home environments. Table/(below) lists the smart home IoT devices deployed in this study and their respective device events for learning and inferring a wide range of user activities related to home safety and security, e.g., a person with smart lock app access entering the home from the front door.

As IoT devices continue to be deployed in smart home applications such as smart locks and surveillance cameras, the knowledge and awareness of IoT device events have become increasingly important for understanding the statuses of IoT devices and detecting anomalous behaviors and attacks towards them. More importantly, multiple IoT device events, happening very closely in time and space, could collectively provide valuable knowledge for inferring user activities in smart homes. Inspired by this critical insight, IoTMosaic explores IoT device events for understanding, profiling, and inferring user activities in smart homes.

TABLE I

SMART HOME IOT DEVICES DEPOLYED IN THIS STUDY AND THEIR RESPECTIVE DEVICE EVENTS

| Device Name | Device Event | Abbreviation |
|---|---|---|
| Arlo Q Camera (AQ) | motion detection | $AQ_{mot}$ |
| August Lock (AL) | WiFi (un)locking | $AL_{wlk}$ |
| | manual (Un)locking | $AL_{mlk}$ |
| | auto locking | $AL_{alk}$ |
| D-Link Water Sensor (DW) | water detected | $DW_{wtr}$ |
| | water not detected | $DW_{nwtr}$ |
| Kangaroo Motion Sensor (KM) | motion detection | $KM_{mot}$ |
| Reolink Camera (RC) | motion detection | $RC_{mot}$ |
| | stream on/off | $RC_{on}/RC_{off}$ |
| Ring Doorbell (RD) | motion detection | $RD_{mot}$ |
| | stream on/off | $RD_{on}/RD_{off}$ |
| | ringing | $RD_{ring}$ |
| Ring Spotlight (RS) | motion detection | $RS_{mot}$ |
| | motion light on/off | $RS_{on}/RS_{off}$ |
| Smart Life Contact Sensor (SC) | open/close | $SC_{open}/SC_{close}$ |
| Tessan Contact Sensor (TC) | open/close | $TC_{open}/TC_{close}$ |
| TP-Link Bulb (TB) | on/off | $TB_{on}/TB_{off}$ |
| TP-Link Plug (TP) | on/off | $TP_{on}/TP_{off}$ |

Profiling user activities with IoT Device Event Sequences:

Recognizing and tracking user activities and behaviors in smart environments have been a long-standing research problem due to its importance in assisted living, remote healthcare, and home safety. In this study, we consider a user activity as the interaction between a person and the smart home environment, e.g., an e-commerce delivery personnel pushing the smart doorbell and leaving a package on the porch. The direct interaction between users and IoT devices, e.g., a user opening or closing the smart lock via the companion smartphone App, is only considered as IoT device events (or actions) instead of user activities. In other words, a user activity, consisting of several human actions, could trigger one or more IoT device events, determined by the availability and deployment of IoT devices as well as the layout of the smart home.

Our real-world experiments with heterogeneous IoT devices deployed in the smart home testbed have discovered that many user activities trigger an ordered sequence of device events from several adjacent IoT devices. For example, a person with the physical key entering our smart home environment from the front door triggers a series of IoT device events related to August smart lock, Tessan Contact Sensor, Ring doorbell, Ring Spotlight, and Alro Q Camera. It should be noted that a single IoT device event is often unable to infer the underlying user activities independently. However, combining and correlating the time and space of multiple events from adjacent IoT devices that are deployed at the nearby locations where user activities happen potentially provide sufficient information for extracting these user activities.

Figure 2:
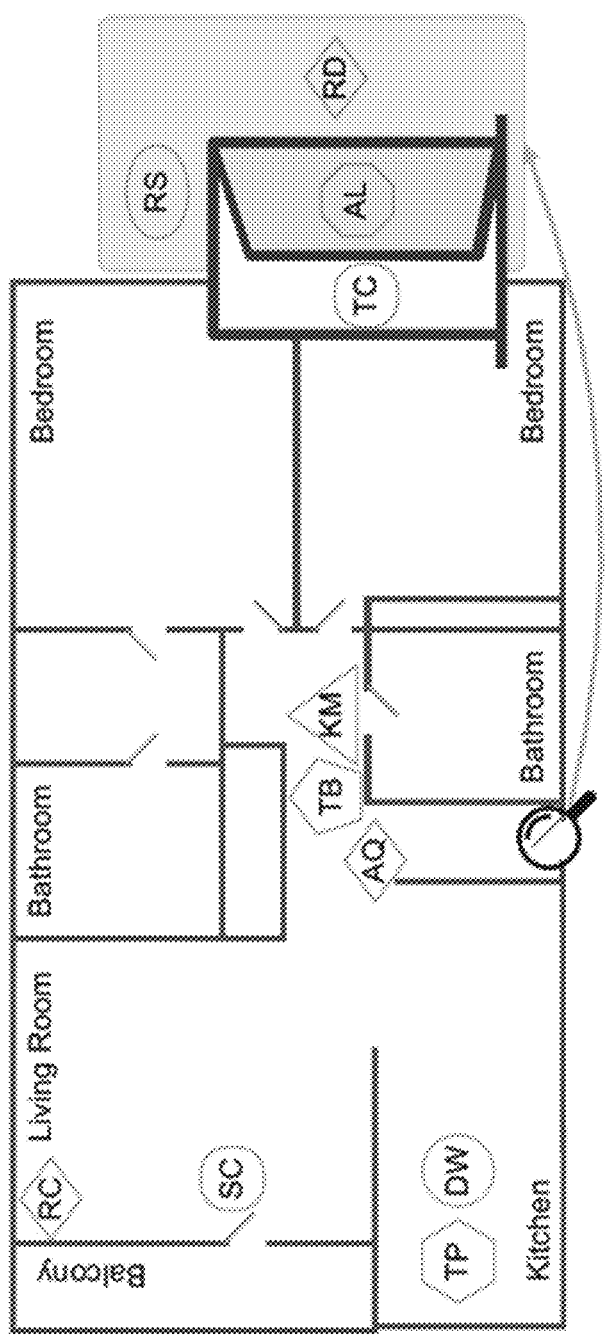
FIG. 2 is an illustration of a layout of IoT device deployment in a real-world smart home showing each IoT device being represented with an abbreviated name.

FIG. 2 illustrates the layout of our smart home experimental environment in a two-bedroom apartment. Given the list of IoT devices in Table/and the deployment of devices in FIG. 2, we use repeated and controlled experiments to discover and generate distinct signatures of user activities with the sequences of IoT device events.

Table II (below) summarizes the list of 21 user activities in our smart home testbed which are common and essential to home safety and security. For each user activity, we repeatedly trigger it 20 times, while simultaneously collecting TCP/IP packets using the programmable home router. To only include IoT device events that are actually triggered by the user activity, we run all of the experiments at this stage in a controlled environment and ensure no other interfering IoT device events or user activities happen at the same time. To avoid the mutual inference of user activities, we separate the experiments of two consecutive user activities for at least 10 minutes.

TABLE II

USER ACTIVITIES AND THEIR SIGNATURES OF IOT
DEVICE EVENT SEQUENCES

| No. | User Activity | Device Even Sequence |
|---|---|---|
| 1 | A person without key entering the home from the fron door (day) | $RD_{mot}$, $RS_{mot}$, $RD_{ring}$, $RD_{on}$, $RD_{off}$, $AL_{mlk}$, $TC_{open}$, $TC_{close}$, $AL_{mlk}$, $AQ_{mot}$ |
| 2 | A person without key entering the home from the front door (night) | $RD_{mot}$, $RS_{on}$, $RD_{ring}$, $RD_{on}$, $RD_{off}$, $AL_{mlk}$, $TC_{open}$, $TC_{close}$, $AL_{mlk}$, $AQ_{mot}$, $RS_{off}$ |
| 3 | A person with app access entering the home from the front door (day) | $RD_{mot}$, $RS_{mot}$, $AL_{wlk}$, $TC_{open}$, $TC_{close}$, $AL_{alk}$, $AQ_{mot}$ |
| 4 | A person with app access entering the home from the front door (night) | $RD_{mot}$, $RS_{on}$, $AL_{wlk}$, $TC_{open}$, $TC_{close}$, $AL_{alk}$, $AQ_{mot}$, $RS_{off}$ |
| 5 | A person with key entering the home from the front door (day) | $RD_{mot}$, $RS_{mot}$, $AL_{mlk}$, $TC_{open}$, $TC_{close}$, $AL_{alk}$, $AQ_{mot}$ |
| 6 | A person with key entering the home from the front door (night) | $RD_{mot}$, $RS_{on}$, $AL_{mlk}$, $TC_{open}$, $TC_{close}$, $AL_{alk}$, $AQ_{mot}$, $RS_{off}$ |
| 7 | A person ring the doorbell and leave (day) | $RD_{mot}$, $RS_{mot}$, $RD_{ring}$ |
| 8 | A person ring the doorbell and leave (night) | $RD_{mot}$, $RS_{on}$, $RD_{ring}$, $RS_{off}$ |
| 9 | A person checking the front door of the home (day) | $RD_{mot}$, $RS_{mot}$ |
| 10 | A person checking the front door of the home (night) | $RD_{mot}$, $RS_{on}$, $RS_{off}$ |
| 11 | A person with key leaving the home from the front door (lock the door) (day) | $AQ_{mot}$, $AL_{mlk}$, $TC_{open}$, $TC_{close}$, $RD_{mot}$, $RS_{mot}$, $AL_{mlk}$ |
| 12 | A person with key leaving the home from the front door (lock the door) (night) | $AQ_{mot}$, $AL_{mlk}$, $TC_{open}$, $TC_{close}$, $RD_{mot}$, $RS_{on}$, $AL_{mlk}$, $RS_{off}$ |
| 13 | A person with key leaving the home from the front door (do not lock the door) (day) | $AQ_{mot}$, $AL_{mlk}$, $TC_{open}$, $TC_{close}$, $RD_{mot}$, $RS_{mot}$ |
| 14 | A person with key leaving the home from the front door (do not lock the door) (night) | $AQ_{mot}$, $AL_{mlk}$, $TC_{open}$, $TC_{close}$, $RD_{mot}$, $RS_{on}$, $RS_{off}$ |
| 15 | A person appearing in the hallway of the home | $KM_{mot}$, $TB_{on}$ |
| 16 | A person leaving the hallway of the home | $KM_{mot}$, $TB_{off}$ |
| 17 | A person checking the living room's camera streaming | $RC_{on}$, $RC_{off}$ |
| 18 | A person entering the balcony from living room or entering the living from balcony (contact sensor alarm off) | $RC_{mot}$ |
| 19 | An person entering the home from the balcony (contact sensor alarm on) | $SC_{ope}$, $RC_{mot}$ |
| 20 | An person leaving the home to enter the balcony ((contact sensor alarm on) | $RC_{mot}$, $SC_{close}$ |
| 21 | A person checking water leakage | $DW_{wtr}$, $TP_{off}$, $DW_{nwtr}$, $TP_{on}$ |

We first extract all device events from the IoT network traffic during the experiment period where user activity U is triggered. For each IoT device event e, we compare its timestamp, i.e., the timestamp of the first packet captured by the smart home router which is matched to e, with the manually-recorded timestamp of the user activity U. Given the existence of clock synchronizations, varying end-to-end network latencies, and automatic events, e.g., August smart lock automatically closes the door if the door remains open for 30 seconds after an unlock event, we consider the device event e is actually generated by the user activity U if and only if $|e.t-U.t| \leq \Omega$. In our experiments, we choose $\Omega$ as 60 seconds as the values from 60 seconds to 5 minutes achieve similar results in mapping the relevant device event e to U.

Sorting all IoT device events associated with each user activity U based on their timestamps leads to an ordered sequence of IoT device events $(e_1, e_2, \ldots, e_n)$. If two or more sequences of IoT device events happen for the same user activity during the 20 experiments, we select the sequence with the most occurrences. Such disparity is not observed in our experiments, as the same user activity always triggers the same sequences of IoT device events. We refer to the sequence of IoT device events, $(e_1, e_2, \ldots, e_n)$, as the signature of the user activity U, as well as the user activity itself.

Table II summarizes the signatures of all 21 user activities with the corresponding IoT device event sequences generated by following the above process. These signatures confirm the feasibility of inferring user activities related to physical safety and security in smart homes from the device events extracted from the IoT network traffic.

User Activity Inference

User activity inference problem:

Given a sequence of IoT device events $\mathbb{S} = (s_1, s_2, \ldots, s_m)$ and a set of user activity signatures $\mathbb{U} = \{U_1, U_2, \ldots, U_r\}$ where $U_i$ is the signature of the user activity i, we define the user activity inference problem as inferring all user activities that generate events in $\mathbb{S}$.

The unpredictability of user activities and the missing and out-of-order device events have created substantial challenges for solving the user activity inference problem. In this paper, we present the first attempt to give a heuristic solution of this problem via finding approximate matches of the user activities' signatures from $\mathbb{S}$. Specifically, we formulate a problem called k≤approximate signature matching and develop an optimal solution for user activity inference based on algorithms designed for solving k≤approximate signature matching problem.

k≤Approximate Signature Matching Problem

The edit distance (ED) between a user activity signature U and a sequence of device events S is defined as the minimum cost of changing $\mathbb{S}$ into U where 1) only the operation of deletion from $\mathbb{S}$ and U is allowed, 2) deletion of an event from U has cost 1, and 3) deletion of an event from $\mathbb{S}$ has cost 0. This definition of ED is different from the classic definition in literature in that the substitution is not a valid operation here because a device event could be missing or out-of-order but should not change into another event. In addition, the costs of deleting different events from U are different due to the varying importance of these events to U. For ease of presentation, we set the cost of deleting any event from U uniformly as 1.

Given a sequence of device events $\mathbb{S}=(s_1, s_2, \ldots, s_m)$, a user activity signature $U=(e_1, e_2, \ldots, e_n)$, and an integer k≥0, we define a k_single-approximate signature match as a minimal-length subsequence of $\mathbb{S}$ with the start index i and end index j and ED $((s_i, \ldots, s_j), U)=k$, where k is the approximation parameter.

The k_approximate signature matching problem is to reveal the maximum number of non-overlapping k_single-approximate matches of U in $\mathbb{S}$, which is referred to as k_approximate match.

The k≤approximate signature matching problem is to find all the approximate matches that: 1) exist in an i_approximate match of U in $\mathbb{S}$ where i≤k; 2) if there exists a match M in i_approximate match, then there does not exist a match M' in j_approximate match where j>i and the start and end indices overlap with those of M. For example, if $\mathbb{S}=(a, a, b, a, c, a, b, a, a, b, a, b, c)$ and $U=(a, b, a, c)$, a 1≤approximate match of U in $\mathbb{S}$ includes two 0_single-approximate signature matches $(s_2, s_3, s_4, s_5)$ and $(s_9, s_{10}, s_{11}, s_{13})$ and one 1_single-approximate signature match $(s_6, s_7, s_8)$.

k Approximate Signature Matching Algorithm

In this section, we first present Algorithm 1 (below) to solve the k_approximate match problem which aims at identifying all k_single-approximate matches of U in $\mathbb{S}$. In Algorithm 1, start records the starting index for the chunk of $\mathbb{S}$ that U is matched against. C is a two-dimensional cost matrix of size (m+1)×(n+1) and C records the edit distance between two sequences $\mathbb{S}_{start,i}$ and $U_{0,j}$. The first row of C is initialized as 0 to n since the cost of matching U to an empty device event sequence equals to cost of deleting events from U. The first column of C is initialized as all 0s because the match of U can start from anywhere in $\mathbb{S}$. The last column of C indicates the edit distance between U and $\mathbb{S}_{start,i}$ where i=start, ..., m-1.

---

Algorithm 1: k_appxMatch($\mathbb{S}$, U, k)

Input: Device event sequence $\mathbb{S}=(s_1, s_2, \ldots, s_m)$, a user
      activity signature $U=(e_1, e_2, \ldots, e_n)$,
      approximation parameter k
Output: A list $L_k$ of all k_single-approximate match U in
      $\mathbb{S}$. Each match is represented by an ordered
      sequence of the indices of device events in $\mathbb{S}$
      matched to U

```
 1   Lₖ ← ∅; start ← 1;
 2   for i := 0 to m do
 3   |      C_{i,0} ← 0;

4   for j := 1 to n do
 5   |      C_{0,j} ← j;

6   for i := 1 to m do
 7   |      for j := 1 to n do
 8   |      |      if sᵢ == cⱼ then
 9   |      |      |      C_{i,j} ← C_{i-1,j-1};
10   |      |      else if C_{i-1,j} < C_{i,j-1} + 1 then
11   |      |      |      C_{i,j} ← C_{i-1,j};
12   |      |      else
13   |      |      |      C_{i,j} ← C_{i-1} + 1;
14   |      if j == n and C_{i,j} == k; then
15   |      |      M ← ∅; p ← i; q ← n;
16   |      |      while q > 0 do
17   |      |      |      if C_{p,q} == C_{p-1,q-1} and s_p == e_q then
18   |      |      |      |      p ← p - 1; q ← q - 1;
19   |      |      |      |      M.insert(p);
20   |      |      |      else if C_{p-1,q} < C_{p,q-1} + 1 then
21   |      |      |      |      p ← p - 1;
22   |      |      |      else
23   |      |      |      |      q ← q - 1;
24   |      |      Lₖ.insert(M);
25   |      |      for j := 1 to n do
26   |      |      |      C_{i,j} ← j; start ← i;

27   output List Lₖ.
```

---

The main idea of Algorithm 1 is that the cost of matching sequence $U_{0,j}$ in $\mathbb{S}_{start,i}$ is the same as the cost of matching $U_{0,j-1}$ in $\mathbb{S}_{start,i-1}$ if $s_i=e_j$. Otherwise, the cost either equals to the cost of matching $U_{0,j}$ in $\mathbb{S}_{start,i-1}$ due to the cost 0 of deleting $s_i$, or equals to the cost of matching $U_{0,j-1}$ in $\mathbb{S}_{start,i-1\ plus}$ 1 due to the cost 1 of deleting $e_j$.

If $C_{i,n}=k$, we find a match of U in $\mathbb{S}$ that ends at $s_i$ with the approximate parameter k. We then output the indices of the current match by backtracking the costs saved in C. Next, we reset the cost matrix by setting the i-th row of C from 0 to n and then continue to find matches starting from $\mathbb{S}_{i+1}$.

Figure 3:
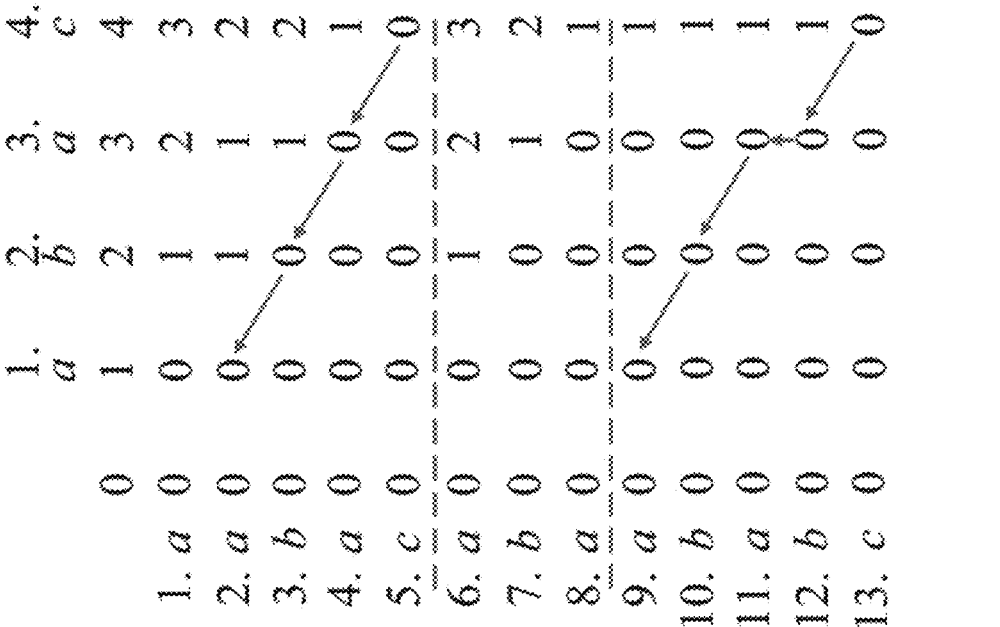
FIG. 3 is an illustration of a running example of Algorithm 1 described herein.

FIG. 3 shows a running example of Algorithm 1 with $\mathbb{S}=(a, a, b, a, c, a, b, a, a, b, a, b, c)$, $U=(a, b, a, c)$, and k=0, respectively. In this example, $s_1$ equals to $e_1$ which are both a, thus $C_{1,1}=0$. $s_1$, i.e., a, does not equal to $e_2$, i.e., b, therefore, $C_{1,2}=1$ because $C_{1,1}+1=1$ and $C_{0,2}=2$. Similarly, we determine the other values in the cost matrix C until comparing $s_5$ with $e_4$ which are both c, so $C_{5,4}=C_{4,3}=0$. As we reach the last column of the cost matrix, and the cost value equals to k=0, we find a match of U in $\mathbb{S}$ with the approximation parameter 0. Then we start from $C_{5,4}$ and revisit the cost matrix to output this match as (5,4,3,2).

We continue on searching for matches from $s_6$ until we find another 0_single-approximate signature match ending at $s_{13}$ as (13,11,10,9). As a result, Algorithm 1 outputs 0_approximate match $L_0=((5,4,3,2), (13,11,10,9))$.

Algorithm 2 (below) presents the solution for the k≤approximate signature matching problem. It outputs $\mathbb{L}=(L_0,$ $L_1, \ldots, L_k$), where $L_i$ records the i_approximate match of U in $\mathbb{S}$. Each element on $L_i$ stores the indices of the device events in $\mathbb{S}$ that form the i_single-approximate match of U.

---

Algorithm 2: k_appxMatch($\mathbb{S}$, U, k)

---

Input: Device event sequence $\mathbb{S}$, a user activity signature U,
    approximation parameter k;
Output: $\mathbb{L} = (L_0, L_1, \ldots, L_k)$ where $L_k$ is the
    k_approximate match of U in $\mathbb{S}$
1 Pre-process $\mathbb{S}$ to remove all the events in $\mathbb{S}$ but not in U;
2 $L_0, L_1, \ldots, L_k \leftarrow \emptyset$;
3 Initialize Q with (0, m − 1) as its only element;
4 for i := 0 to k do
5 | T ← null;
6 | while Q do
7 | | H ← Q.head( ); D ← $\mathbb{S}$ [H.start, H.end];
8 | | $L_k$.append(k_appxMatch(D, U, i));
9 | | for each k_approximate match in $L_k$ do
10 | | | B ← the event sequence before M in D;
11 | | | D ← the event sequence before M in D;
12 | | | if B is not empty then
13 | | | | start ← starting index of B;
14 | | | | end ← ending index of B;
15 | | | | T.append(start, end);
16 | | | if D is not empty then
17 | | | | start ← starting index of D;
18 | | | | end ← ending index of D;
19 | | | | T.append(start, end);
20 | Q ← T;
21 return $\mathbb{L}$.

---

The main idea of Algorithm 2 is to start from 0_approximate match, repeatedly discover the i_approximate match of U in $\mathbb{S}$, and remove all the device events in the i_approximate match from $\mathbb{S}$ until i=k. Indices of events in $\mathbb{S}$ are carefully recorded that only portions of device events in $\mathbb{S}$ that do not overlap with the starting and ending indices of matches to U in the current round will be considered in the next round. In this way, only non-overlapping matches are selected for output and approximate matches with smaller k are discovered before approximate matches with bigger k. List Q is designed to save a list of a pair of starting and ending indices for a continuous portion of $\mathbb{S}$ that have not been matched in the approximate match with smaller k. The output of Algorithm 2 with k=3 on the running example in FIG. 3 is $L_0$=((2,5), (9,13)), $L_1$=((6,8)), $L_2$=Ø, and $L_3$=((1,1)).

Theorem 1: The time complexity of k_appxMatch algorithm is O(mn) and the time complexity of k_appxMatch algorithm is O(kmn) where m is the number of events in $\mathbb{S}$ and n is the number of events in U.

Proof Sketch. This can be derived from the execution of the algorithms. Details are omitted due to space limitations.

Theorem 2: The k_appxMatch algorithm outputs the maximum number of non-overlapping k_single-approximate signature matches of U in $\mathbb{S}$.

Proof Sketch. It has been proved in literature that given a sequence of overlapped time intervals, the greedy algorithm which chooses an interval with the earliest finish time and excludes all other overlapping intervals, outputs the maximum number of non-overlapping intervals. The k_appxMatch algorithm indeed outputs the match with the earliest finish time first and it only considers non-overlapping matches.

Inferring User Activities via Approximate Matching

With the k_appxMatch algorithm, we can discover approximate matches of each user activity independently.

However, it is possible that two matches of different user activities share overlapped device events which cause collisions and ambiguity. Therefore, we further develop a trimming step to remove the collisions in the device event sequences that are matched to different user activities.

The trimming heuristics in the last step of inferring user activities prefer a match with a smaller approximate parameter k or a longer sequence of IoT device events in its signature. This trimming step is designed based on the following empirical observations from our real-world experiments:

The chance of missing device events in the signatures of user activities during the matching is marginal. Thus we always prefer matches with smaller values of k.

2) If the signature of one user activity is a subset of another one and both of them are matched independently, the user activity with the superset signature is preferred if both activities are inferred at the same time.

3) If two user activities from different users have overlapping device events, and these two activities happen at the same time, then it is possible that the overlapped events are shared by both of them. For example, if one user is entering the home from the hallway while another user is heading towards the kitchen through the hallway, these two user activities will only generate one light on event since the light will be turned on only once. Thus this device event is shared by these two user activities and can be mapped to both of them during the matching.

Algorithm 3 (below) presents the pseudocode of the final algorithm of user activity inference and outputs the set of inferred user activities from the IoT device event streams with the simple yet effective trimming heuristic step.

---

Algorithm 3: actInfer($\mathbb{S}$, $\mathbb{U}$, k)

---

Input: A device event sequence $\mathbb{S}$, an ordered sequence of
    signatures of all user activities by their lengths
    $\mathbb{U} = (U_1, U_2, \ldots, U_r)$, k
Output: $L_{U_1}, L_{U_2}, \ldots, L_{U_r}$ where collisions in approximate
    matches have been removed
1 for i := 0 to r do
2 | $L_{U_i} \leftarrow$ k_appxMatch($\mathbb{S}$, $U_i$, k);
3 for i := 0 to k do
4 | for j := 1 to r do
5 | | for M ∈ $L_{U_j}{}^i$, do
6 | | | if ∃M' ∈ $L_{U_j}{}^{i'}$, (i' < i) and M ∩ M' ≠ Ø then
7 | | | | remove M from $L_{U_j}{}^i$;
8 | | | else if ∃M' ∈ $L_{U_j}$, (j ≠ j') and M ⊆ M' then
9 | | | | remove M from $L_{U_j}{}^i$;
10 output $L_{U1}, L_{U2}, \ldots, L_{Ur}$.

---

Testing and Performance Evaluations

Experiment Setup of Smart Home Environments

To evaluate our proposed algorithms of inferring user activities from IoT network traffic, a real-world smart home environment was designed and implemented, as illustrated in FIG. 2, where a number of heterogeneous IoT devices were deployed. In this smart home environment, each user activity enumerated in Table II will trigger at least one IoT device event, thus leading us to observe and collect IoT network traffic via the programmable home router.

In our experiment, we use the Linksys WRT1900AC router running the OpenWrt operating system to collect TCP/IP packets for all the outgoing and incoming network traffic between IoT devices and remote hosts as well as internal traffic in the local area network (LAN) traffic between IoT devices. For each IoT device event, we adopt the method in Wan et al. for generating its signature consisting of an ordered sequence of IP packets with inter-packet time intervals. Based on these signatures, we run the signature matching and event extraction algorithms in Wan et al. on the collected traffic to detect all of the IoT device events that happened in the smart home.

For each of the 21 user activities in Table II, we first learn and build its signature via capturing and studying the underlying IoT network traffic while intentionally repeating the activity with time logs, which serve as the labeled ground truth. Extracting IoT device events from the network traffic and correlating them with the labeled and repeated user activities allow us to recognize and generate the signatures for all 21 user activities. To evaluate the performance of our proposed user activity inference algorithms, we also repeatedly run thousands of user activities at different times and days with time logs over a two-month evaluation period. In addition, our smart home environment continuously collects IoT network traffic, even during the time that we are not actively running the experiments of triggering the 21 user activities. The labeled user activities and collected IoT network traffic provide the valuable dataset for evaluating the correctness and accuracy of our algorithms for inferring user activities.

Although shared smart home IoT network traffic datasets have been shared, none of them include the labeled mapping between individual user activity and the corresponding network traffic. Thus, our experiment setup and the collected dataset will potentially provide the IoT research community a unique dataset for understanding user behaviors from network traffic.

Evaluation Metrics

To evaluate and quantify the performance of our proposed algorithms, we use the widely used metrics, i.e., true positives ($\mathcal{TP}$), false positive ($\mathcal{FP}$), false negative ($\mathcal{FN}$), and true negative ($\mathcal{TN}$). Specifically, for a given inferred user activity $\alpha'$, if a matching real user activity is found at the same time from the ground truth, we consider this activity as a true positive. However, if there is no matching user activity from the ground truth, we consider it as a false positive. For a given real user activity, if the user activity inference algorithms report a different inferred user activity, e.g., $\beta'$, or simply fail to report an inferred user activity, we consider it as a false negative. When the user inference algorithms do not report an inferred user activity $\alpha'$ for any real user activity other than $\alpha$ in the ground truth, it is a true negative. In our experiments, we always observe perfect true negative results, thus we leave the true negative measures out of the experiment results.

In addition to these four measures from the confusion matrix, we also use precision (P), recall (R), accuracy (A), and F1 score to understand the overall quality of our user activity inferring experiments. The precision is calculated as $$\mathcal{P} = \frac{\mathcal{TP}}{\mathcal{TP} + \mathcal{FP}},$$

while the recall is $$\mathcal{R} = \frac{\mathcal{TP}}{\mathcal{TP} + \mathcal{FN}}.$$

The accuracy can be calculated $$\mathcal{A} = \frac{\mathcal{TP} + \mathcal{TN}}{\mathcal{TP} + \mathcal{TN} + \mathcal{FP} + \mathcal{FN}}.$$

The F1 score is the harmonic mean of precision and recall and can be calculated as $$2 \times \frac{\mathcal{P} \times \mathcal{R}}{\mathcal{P} + \mathcal{R}}.$$

Experimental Results

Using performance evaluation metrics introduced in Section V-B, we present the performance of our proposed user activity inference system in three phases. In the first phase, we present the experimental results of running the $0_{\leq}$approximate matching algorithm, i.e., requiring the exact matching of device event sequences for all user activities. In the second phase, we present the result of running the $1_{\leq}$approximate matching algorithm, allowing at most one missing device event due to packet delays and losses or device malfunctions. In the third and final phase, we add the optimization rules to the $1_{\leq}$approximate matching algorithm for substantially improving the performance of user activity inference.

1) Phase I: $0_{\leq}$approximate matching. Our experiments of running $0<$approximate matching algorithm for inferring thousands of user activities in the real-world smart home environment have shown that the overall value of accuracy, precision, and recall are 0.96, 0.99, and 0.97, respectively, as illustrated in columns 6 to 8 of the last row in Table III (below). We can observe that most of the user activities can be detected correctly. However, the user activity inference algorithms occasionally fail to detect user activities #2, #4, #6, #8, #10, #11, #12, and #14, leading to a small number of false negatives, as shown on the fifth column of Table III.

TABLE III

EXPERIMENTAL RESULTS OF OUR PROPOSED USER ACTIVITY INFERENCE
ALGORITHMS IN THE REAL-WORLD SMART HOME ENVIRONMENT

| User | | Phase I | | | | | | Phase II | | | | | | Phase III | | | | | |
|------|-----|-----|----|----|------|------|------|-----|----|----|------|------|------|-----|----|----|------|------|------|
| Acct | # | TP | FP | FN | A | P | R | TP | FP | FN | A | P | R | TP | FP | FN | A | P | R |
| 1 | 112 | 112 | 0 | 0 | 1.00 | 1.00 | 1.00 | 112 | 0 | 0 | 1.00 | 1.00 | 1.00 | 112 | 0 | 0 | 1.00 | 1.00 | 1.00 |
| 2 | 115 | 105 | 0 | 10 | 0.91 | 1.00 | 0.91 | 115 | 0 | 0 | 1.00 | 1.00 | 1.00 | 115 | 0 | 0 | 1.00 | 1.00 | 1.00 |
| 3 | 112 | 112 | 0 | 0 | 1.00 | 1.00 | 1.00 | 112 | 0 | 0 | 1.00 | 1.00 | 1.00 | 112 | 0 | 0 | 1.00 | 1.00 | 1.00 |
| 4 | 115 | 106 | 0 | 9 | 0.92 | 1.00 | 0.92 | 115 | 0 | 0 | 1.00 | 1.00 | 1.00 | 115 | 0 | 0 | 1.00 | 1.00 | 1.00 |
| 5 | 113 | 113 | 0 | 0 | 1.00 | 1.00 | 1.00 | 113 | 0 | 0 | 1.00 | 1.00 | 1.00 | 113 | 0 | 0 | 1.00 | 1.00 | 1.00 |
| 6 | 115 | 97 | 0 | 18 | 0.84 | 1.00 | 0.84 | 115 | 0 | 0 | 1.00 | 1.00 | 1.00 | 115 | 0 | 0 | 1.00 | 1.00 | 1.00 |

TABLE III-continued

EXPERIMENTAL RESULTS OF OUR PROPOSED USER ACTIVITY INFERENCE
ALGORITHMS IN THE REAL-WORLD SMART HOME ENVIRONMENT

| User Acct | # | Phase I | | | | | | Phase II | | | | | | Phase III | | | | | |
|---|---|---|---|---|---|---|---|---|---|---|---|---|---|---|---|---|---|---|---|
| | | TP | FP | FN | A | P | R | TP | FP | FN | A | P | R | TP | FP | FN | A | P | R |
| 7 | 112 | 112 | 0 | 0 | 1.00 | 1.00 | 1.00 | 112 | 0 | 0 | 1.00 | 1.00 | 1.00 | 112 | 0 | 0 | 1.00 | 1.00 | 1.00 |
| 8 | 112 | 110 | 0 | 2 | 0.98 | 1.00 | 0.98 | 112 | 0 | 0 | 1.00 | 1.00 | 1.00 | 112 | 0 | 0 | 1.00 | 1.00 | 1.00 |
| 9 | 121 | 121 | 0 | 0 | 1.00 | 1.00 | 1.00 | 121 | 78 | 0 | 0.61 | 0.61 | 1.00 | 121 | 0 | 0 | 1.00 | 1.00 | 1.00 |
| 10 | 112 | 105 | 0 | 7 | 0.94 | 1.00 | 0.94 | 112 | 0 | 0 | 1.00 | 1.00 | 1.00 | 112 | 0 | 0 | 1.00 | 1.00 | 1.00 |
| 11 | 350 | 347 | 0 | 3 | 0.99 | 1.00 | 0.99 | 350 | 0 | 0 | 1.00 | 1.00 | 1.00 | 350 | 0 | 0 | 1.00 | 1.00 | 1.00 |
| 12 | 294 | 269 | 0 | 25 | 0.91 | 1.00 | 0.91 | 294 | 0 | 0 | 1.00 | 1.00 | 1.00 | 294 | 0 | 0 | 1.00 | 1.00 | 1.00 |
| 13 | 116 | 116 | 0 | 0 | 1.00 | 1.00 | 1.00 | 116 | 0 | 0 | 1.00 | 1.00 | 1.00 | 116 | 0 | 0 | 1.00 | 1.00 | 1.00 |
| 14 | 113 | 98 | 0 | 15 | 0.87 | 1.00 | 0.87 | 113 | 0 | 0 | 1.00 | 1.00 | 1.00 | 113 | 0 | 0 | 1.00 | 1.00 | 1.00 |
| 15 | 138 | 138 | 0 | 0 | 1.00 | 1.00 | 1.00 | 138 | 33 | 0 | 0.81 | 0.81 | 1.00 | 138 | 0 | 0 | 1.00 | 1.00 | 1.00 |
| 16 | 132 | 132 | 0 | 0 | 1.00 | 1.00 | 1.00 | 132 | 33 | 0 | 0.81 | 0.81 | 1.00 | 132 | 0 | 0 | 1.00 | 1.00 | 1.00 |
| 17 | 112 | 112 | 0 | 0 | 1.00 | 1.00 | 1.00 | 112 | 0 | 0 | 1.00 | 1.00 | 1.00 | 112 | 0 | 0 | 1.00 | 1.00 | 1.00 |
| 18 | 224 | 224 | 16 | 0 | 0.93 | 0.93 | 1.00 | 224 | 16 | 0 | 0.93 | 0.93 | 1.00 | 224 | 16 | 0 | 0.93 | 0.93 | 1.00 |
| 19 | 112 | 112 | 0 | 0 | 1.00 | 1.00 | 1.00 | 112 | 0 | 0 | 1.00 | 1.00 | 1.00 | 112 | 0 | 0 | 1.00 | 1.00 | 1.00 |
| 20 | 113 | 113 | 0 | 0 | 1.00 | 1.00 | 1.00 | 113 | 0 | 0 | 1.00 | 1.00 | 1.00 | 113 | 0 | 0 | 1.00 | 1.00 | 1.00 |
| 21 | 116 | 116 | 0 | 0 | 1.00 | 1.00 | 1.00 | 116 | 0 | 0 | 1.00 | 1.00 | 1.00 | 116 | 0 | 0 | 1.00 | 1.00 | 1.00 |
| all | 2959 | 2870 | 16 | 89 | 0.96 | 0.99 | 0.97 | 2959 | 158 | 0 | 0.95 | 0.95 | 1.00 | 2959 | 16 | 0 | 0.99 | 0.99 | 1.00 |

Our in-depth investigation has discovered that nearly all of these false negatives are caused by the "missing" Ring Doorbell's motion detection event from the device event sequences of these user activities. The underlying root cause of these "missing" events is the multiple-second long delay of reporting these motion events by the battery-powered Ring Doorbell, leading to the out-of-order device events for these user activities. In other words, these motion events are simply delayed, actually not missing. However, as the $0_{\leq}$approximate matching algorithm requires the exact matching of device event sequences for all user activities, these cases with out-of-order device events are reported as false negatives.

In addition to these false negatives, there are also 16 cases of false positive for user activity #18. Our follow-up analysis reveals that the real user activities indeed have happened as inferred, but are not recorded in our controlled experiments. This observation suggests that our user activity inference algorithms could potentially monitor real-time IoT network traffic and alert homeowners on unexpected or anomalous user activities for home safety and other applications.

Figure 4:
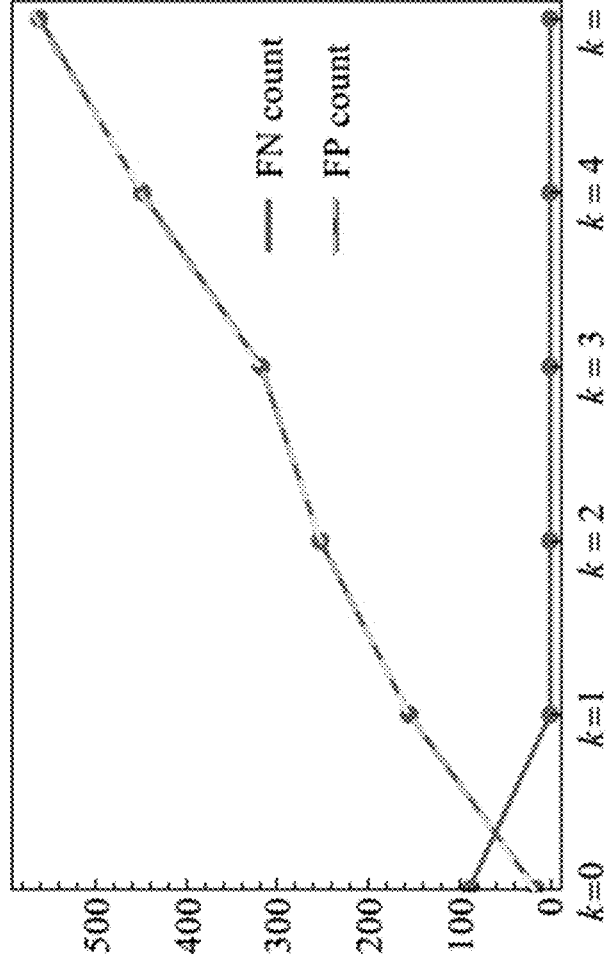
FIG. 4 is a graph illustrating tradeoff analysis of false positives v. false negatives with varying k as described herein.

2) Phase II: $1_{\leq}$approximate matching. Running the $0_{\leq}$approximate matching algorithm for inferring thousands of user activities achieves high accuracy, but returns a nontrivial of false negatives. Therefore, in phase II we explore the increase of the value of k in the matching algorithm for accommodating the missing and out-of-order device events when searching and matching the signatures of user activities. To understand and quantify the performance tradeoff, specifically false positives and false negatives with varying k, we run the $k_{\leq}$approximate matching with the value of k increasing from 0 to 5. As illustrated in FIG. 4, the increase of k leads to lower false negatives but higher false positives. In addition, increasing k from 1 to 2, 3, 4, 5 achieves marginal improvements in false negatives, but incurs significant penalties in false positives. Therefore, we choose $1_{\leq}$approximate matching algorithms for the remaining experiment evaluations.

By setting k as 1, the approximate matching algorithm allows at most one missing or out-of-order device event when matching the signatures of user activities. Such flexibility effectively addresses the challenge of the long delay of the Ring Doorbell's motion detection event, and significantly improves the performance of our user activity inference system in the smart home environment. As shown in the column 11 of Table III, the false negative measures of user activities #2, #4, #6, #8, #10, #11, #12, and #14 drop to 0.

However, in column 10 of the same table, we also observe the increase of false positive measures from 0 to 78, 33, 33 for user activities #9, #15, and #16, respectively. Our follow-up analysis discovers that the signatures of all of these three user activities (#9, #15, and #16) have a length of 2 device events. The short length of 2 device events in the signatures explains the high false positives, since $1_{\leq}$approximate matching algorithm will report the matching success of one of these activities whenever finding one single device event in their signatures. Given the above observations, we continue to explore optimization rules in the approximate matching algorithm to reduce high false positives while maintaining low false negatives during the matching process.

3) Phase III: $1_{\leq}$approximate matching with optimization. Inspired by the findings of high false positives for the short device event sequences, we add a simple yet effective optimization rule for the approximate matching algorithm. Specifically, when the length of the device event sequence for a user activity is equal to or less than a certain threshold, referred to as $\theta$, we only run the $0_{\leq}$approximate matching algorithm to infer such activities. The intuition of such optimization rule lies in the observation that when the length of the device event sequence in the user activity signature is short, the probability of finding false positives is very high. Based on our empirical results, we set $\theta$ as 3 in our experiments.

Figure 5:
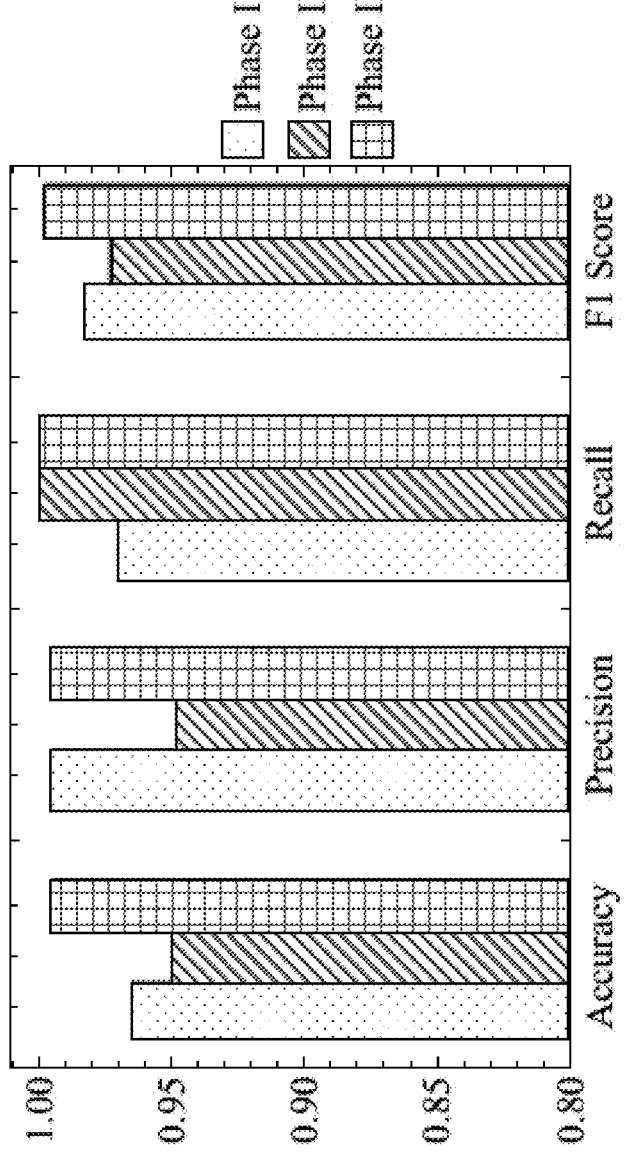
FIG. 5 is a bar graph illustrating overall accuracy, precision, recall, and F1 scores of Phase I, Phase II, and Phase III, respectively, as described herein.

As shown in columns 16 and 17 in Table III, the false positives of user activities #9, #15, and #16 drop to 0 thanks to the simple yet effective optimization rule. The only remaining false positives correspond to user activity #18, which are caused by real but uncontrolled user activities that were not recorded in our experiments. FIG. 5 compares the overall accuracy, precision, recall, and F1 scores of running our proposed user activity inference algorithms over three phases: $0_{\leq}$approximate matching, $1_{\leq}$approximate matching, $1_{\leq}$approximate matching with optimization, respectively. Clearly, $1_{\leq}$approximate matching with the simple and intuitive optimization rule achieves the best performance.

In summary, our two-month long experiments have shown that our proposed user activity inference system is able to effectively and accurately detect and infer user activities from IoT network traffic in smart homes. By applying the approximation matching algorithm with the simple optimization rule, we achieve the overall values of accuracy, precision, and recall as 0.99, 0.99, and 1.00, respectively. Different from known technologies, IoTMosaic first detects IoT device events from smart home network traffic and then recognizes and profiles user activities to map them to their triggered IoT device event sequences. Subsequently, IoTMosaic develops an effective approximate matching algorithm for inferring user activities in smart homes, which could provide homeowners critical insights on what is happening in their homes instantly and automatically.

Stated another way, the present inventive concept proposes IoTMosaic for inferring user activities from IoT network traffic. Based on the IoT device events detected from smart home network traffic, IoTMosaic generates the signatures of diverse user activities consisting of IoT device event sequences. Given the observation of missing and out-of-order device events due to device malfunctions and varying network latencies, we design the approximate matching algorithms to capture the exact or approximate matches of user activities' signatures in the device event sequence. In addition, we devise a heuristic trimming strategy to resolve the conflicts in multiple matches of user activities due to overlapping device events in their signatures. Our two-month experimental results with thousands of user activities in a real-world smart home show that our proposed algorithms can infer different user activities with accuracy, precision, and recall of 0.99, 0.99, and 1.00, respectively. Other contemplated applications centered on deploying IoTMosaic in other smart environments and exploring the applications of the system such as home safety and anomaly detection.

An example method associated with the system 100 is illustrated in FIG. 6.

Computing Device: Referring to FIG. 6, a computing device 1200 is illustrated which may be configured, via one or more of an application 1211 or computer-executable instructions, to execute functionality described herein (e.g., train and/or execute a machine learning (ML) model, and/or execute machine-readable instructions). More particularly, in some embodiments, aspects of the predictive methods herein may be translated to software or machine-level code, which may be installed to and/or executed by the computing device 1200 such that the computing device 1200 is configured to execute functionality described herein. It is contemplated that the computing device 1200 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 1200 may include various hardware components, such as a processor 1202, a main memory 1204 (e.g., a system memory), and a system bus 1201 that couples various components of the computing device 1200 to the processor 1202. The system bus 1201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 1200 may further include a variety of memory devices and computer-readable media 1207 that includes removable/non-removable media and volatile/non-volatile media and/or tangible media, but excludes transitory propagated signals. Computer-readable media 1207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 1200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 1204 includes computer storage media in the form of volatile/nonvolatile memory such as read only memory (ROM) and random access memory (RAM). A basic input/output system (BIOS), containing the basic routines that help to transfer information between elements within the computing device 1200 (e.g., during start-up) is typically stored in ROM. RAM typically contains data and/or program modules that are immediately accessible to and/or presently being operated on by processor 1202. Further, data storage 1206 in the form of Read-Only Memory (ROM) or otherwise may store an operating system, application programs, and other program modules and program data.

The data storage 1206 may also include other removable/non-removable, volatile/nonvolatile computer storage media. For example, the data storage 1206 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 1200.

A user may enter commands and information through a user interface 1240 (displayed via a monitor 1260) by engaging input devices 1245 such as a tablet, electronic digitizer, a microphone, keyboard, and/or pointing device, commonly referred to as mouse, trackball or touch pad. Other input devices 1245 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 1245 are in operative connection to the processor 1202 and may be coupled to the system bus 1201, but may be connected by other interface and bus structures, such as a parallel port, game port or a universal serial bus (USB). The monitor 1260 or other type of display device may also be connected to the system bus 1201. The monitor 1260 may also be integrated with a touch-screen panel or the like.

The computing device 1200 may be implemented in a networked or cloud-computing environment using logical connections of a network interface 1203 to one or more remote devices, such as a remote computer. The remote computer may be a personal computer, a server, a router, a network PC, a peer device or other common network node, and typically includes many or all of the elements described above relative to the computing device 1200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 1200 may be connected to a public and/or private network through the network interface 1203. In such embodiments, a modem or other means for establishing communications over the network is connected to the system bus 1201 via the network interface 1203 or other appropriate mechanism. A wireless networking component including an interface and antenna may be coupled through a suitable device such as an access point or peer computer to a network. In a networked environment, program modules depicted relative to the computing device 1200, or portions thereof, may be stored in the remote memory storage device.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a stand-alone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 1202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Computing systems or devices referenced herein may include desktop computers, laptops, tablets e-readers, personal digital assistants, smartphones, gaming devices, servers, and the like. The computing devices may access computer-readable media that include computer-readable storage media and data transmission media. In some embodiments, the computer-readable storage media are tangible storage devices that do not include a transitory propagating signal. Examples include memory such as primary memory, cache memory, and secondary memory (e.g., DVD) and other storage devices. The computer-readable storage media may have instructions recorded on them or may be encoded with computer-executable instructions or logic that implements aspects of the functionality described herein. The data transmission media may be used for transmitting data via transitory, propagating signals or carrier waves (e.g., electromagnetism) via a wired or wireless connection.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A system, comprising:
   a processor in communication with a memory, the memory including instructions executable by the processor to:
   access a sequence of device events S,
   access a plurality of user activity signatures, each user activity signature U in the plurality of user activity signatures comprising a known sequence of device events, and infer user activity from the sequence of device events S, wherein the processor:

calculates a minimum cost of changing a subsequence of S into an activity signature U, and determines a plurality of approximate matches between the sequence of device events S and each activity signature U in the plurality of user activity signatures by:

identification of a plurality of subsequences of S with an associated cost in less than or equal to a parameter k, the parameter k being predetermined and associated with approximation, iterative removal of each subsequence in the plurality of subsequences of S if the subsequence still exists in S, inclusion of the removed subsequence in the plurality of approximate matches, wherein iterative removal of the subsequence of device events from the sequence of events is such that the subsequences of device events with a smallest cost are removed first, and, if the cost of two or more of the subsequences are equal, removing the subsequence of the activity signature of greatest length first.

2. The system of claim 1, wherein the minimum cost of changing a subsequence of S into the activity signature U:

removes a minimum number of device events from the subsequence of S and from the known sequence of device events of the activity signature U until remaining device events in the subsequence of S and the known sequence of device events of the activity signature U are identical; and sums a plurality of importance weights, each importance weight in the plurality of importance weights associated with a device event removed from the known sequence of device events of the activity signature U.

3. The system of claim 1, wherein the sequence of device events based on IoT device events from at least one smart home device.

4. The system of claim 1, wherein a value of k is predetermined to increase or decrease a false positive rate or a false negative rate for predicting the user activity.

5. The system of claim 1, further comprising:

a threshold variable accessible to the processor, where activity signatures having a sequence length less than or equal to the threshold variable have an associated parameter k equal to 0.

6. A method, comprising:

accessing a sequence of device events;

accessing a plurality of user activity signatures, each user activity signature of the plurality of user activity signatures encompassing a known sequence of device events; and inferring a set of user activities from the sequence of device events by iterative identification of one or more approximate matches of a user activity signature of the plurality of user activity signatures from the sequence of device events, each approximate match of the one or more approximate matches being a subsequence of the sequence of device events having a removal cost from the sequence of device events that is less than or equal to a maximum approximation value, including comparing a first length of a first user activity signature associated with a first subsequence with a second length of a second user activity signature associated with a second subsequence where respective removal costs of the first subsequence and the second subsequence are equal and where the first length is greater than the second length;

removing the first subsequence from the sequence of device events; and removing the second subsequence from the sequence of device events following removal of the first subsequence from the sequence of device events.

7. The method of claim 6, further comprising:

determining, for a subsequence of the sequence of device events, a minimum removal cost of changing the subsequence into a user activity signature of the plurality of user activity signatures.

8. The method of claim 6, further comprising:

identifying one or more approximate matches of a user activity signature of the plurality of user activity signatures from the sequence of device events, each approximate match of the one or more approximate matches being a subsequence of the sequence of device events having a removal cost from the sequence of device events that is equal to a transient approximation value, the transient approximation value being less than or equal to the maximum approximation value; and removing the subsequence from the sequence of device events.

9. The method of claim 8, further comprising:

incrementing the transient approximation value following identification of all approximate matches having removal costs that are equal to the transient approximation value until the transient approximation value is equal to the maximum approximation value.

10. The method of claim 6, the removal cost for a subsequence being evaluated based on an edit distance between the subsequence and a user activity signature, the edit distance corresponding to a minimum removal cost of changing the subsequence to the user activity signature where an operation of deletion of a device event from the user activity signature has a first removal cost value, an operation of deletion of a device event from the subsequence has a second removal cost value, and an operation of substitution of a device event from the user activity signature or the subsequence is prohibited.

11. The method of claim 6, each approximate match of the one or more approximate matches being represented by an ordered pair of starting indices and ending indices of the subsequence that matches the user activity signature.

12. The method of claim 6, further comprising:

removing one or more subsequences from the sequence of device events based on removal cost in ascending order.

13. A method, comprising:

accessing a sequence of device events;

accessing a plurality of user activity signatures, each user activity signature of the plurality of user activity signatures encompassing a known sequence of device events; and inferring a set of user activities from the sequence of device events by iterative identification of one or more approximate matches of a user activity signature of the plurality of user activity signatures from the sequence of device events, each approximate match of the one or more approximate matches being a subsequence of the sequence of device events having a removal cost from the sequence of device events that is less than or equal to a maximum approximation value, including comparing a first approximate match associated with a first user activity signature to a second approximate match associated with a second user activity signature, the first approximate match and the second approximate match having an overlapping event index and the first user activity signature being a subset of the second user activity signature; and removing the first approximate match from the one or more approximate matches.

14. The method of claim 13, the sequence of device events being captured from at least one smart home device.

* * * * *